United States Patent [19]

Franklin

[11] Patent Number: 5,316,348
[45] Date of Patent: May 31, 1994

[54] WRENCH SLEEVE ATTACHMENT FOR GARDEN HOSE

[75] Inventor: H. Joe Franklin, Pampa, Tex.

[73] Assignee: William F. Franklin, Dallas, Tex.

[21] Appl. No.: 618,485

[22] Filed: Nov. 27, 1990

[51] Int. Cl.[5] .................................. F16L 35/00
[52] U.S. Cl. ...................... 285/39; 285/116; 138/110
[58] Field of Search ............ 285/39, 114, 115, 116; 138/110; 81/55, 56

[56] References Cited

U.S. PATENT DOCUMENTS

| | | | |
|---|---|---|---|
| 1,044,013 | 11/1912 | Burnett | 138/110 |
| 1,191,888 | 7/1916 | Glauber | 138/110 |
| 1,309,395 | 7/1919 | Clapp | 285/116 |
| 1,318,088 | 10/1919 | Klein | 81/55 |
| 1,507,362 | 9/1924 | Bartosik | 81/55 |
| 1,971,500 | 8/1934 | Palmer | 285/116 |
| 2,295,830 | 9/1942 | Carlson | 138/110 |
| 3,479,713 | 11/1969 | Weatherhead, Jr. et al. | |
| 3,527,478 | 9/1970 | Enssle | 285/38 |
| 3,868,049 | 2/1975 | Johnston | |
| 4,459,716 | 7/1984 | Valdez | 7/100 |
| 4,602,808 | 7/1986 | Herron et al. | 285/115 X |
| 4,613,158 | 9/1986 | Elkman | |
| 4,706,850 | 11/1987 | Remaks | |
| 4,805,933 | 2/1989 | Swisher | D85/115 X |
| 4,817,997 | 4/1989 | Ingram | |
| 4,940,262 | 7/1990 | Baracat | 285/114 |
| 4,947,713 | 8/1990 | Arnold | 81/121.1 |

*Primary Examiner*—Randolph A. Reese
*Assistant Examiner*—Heather Chun
*Attorney, Agent, or Firm*—Trask, Britt & Rossa

[57] ABSTRACT

A sleeve is configured to fit slidably around a water hose. One end of the sleeve is oriented towards an end coupling, and is configured as a wrench to register with the external surface of the coupling.

10 Claims, 2 Drawing Sheets

WRENCH SLEEVE ATTACHMENT FOR GARDEN HOSE

BACKGROUND OF THE INVENTION

1. Field

This invention relates to water hoses, particularly those commonly used by households for supplying water to gardens and other related household uses. It is particularly directed to reinforcement sleeves used in connection with such hoses and provides an improved such sleeve which facilitates the coupling and decoupling of a hose to a water supply fixture.

2. State of the Art

Water supply hoses of the type commonly referred to as garden hoses are widely used by households for a variety of purposes. The use of such hoses is burdened by various recurring inconveniences associated with the propensity of such hoses to develop kinks as they are moved about or repositioned. Water hoses are conventionally stored in coiled condition, and kinks tend to develop as the hose is moved about in a fashion which tends to twist the resulting coils. Frequently, an effective closure of a hose occurs near its supply end when the hose is stretched or otherwise manipulated. Accordingly, some hoses are provided with a reinforcement sleeve which is either permanently fixed or positionable in the proximity of a kink-prone region of the hose. Such reinforcing sleeves are of sufficient length, conventionally between about 8 and about 20 inches to maintain the hose in an unkinked condition. Slidably-mounted reinforcement sleeves, while they may be configured either the same as or unlike the cross-sectional configuration of the hose, are ordinarily sized to move easily along the longitudinal axis of the hose when the hose is in either a straightened or nearly straightened condition.

The most common location of the reinforcing sleeve is adjacent or near the connection point of the hose to the supply fixture. A water flow restricting kink is readily developed when the hose is pulled in a fashion which bends its sidewalls in the proximity of this attachment point. The reinforcing sleeve distributes forces along a sufficient length of the hose to avoid the development of such a kink.

Although most water hoses are circular in cross-sectional configuration, a reinforcement sleeve used with such hoses may have a polygonal cross-sectional configuration. Non-circular configurations facilitate manual movement of the sleeve and provide additional resistance against kinking.

Another common difficulty experienced with water hoses occurs in the attachment or detachment of an end of a length of hose to a water supply fixture or another length of hose. The water supply fixture is typically in the form of a faucet with a male-threaded outlet portion adapted to receive corresponding female threads carried by a coupling fixture at one (supply) end of the hose. A male-threaded coupling fixture is ordinarily carried at the opposite (discharge) end of the hose so that a pair of hoses may be connected by coupling the supply end of one length of hose with the discharge end of a second length of hose. After a period of use, the male threads of an outdoor water faucet tend to become damaged, corroded or otherwise difficult to couple with the corresponding female hose threads. The threads of even a new water tap may be unsuitable to effect a good, water-tight connection with a hose coupling because such fixtures are often of indifferent quality. In any event, the threaded fixtures carried at either end of a hose are exposed to damage through use. Moreover, it is often difficult to decouple a hose connection, whether between a hose and water supply or between two lengths of hose, after they have been connected for a period of time. Such connections often corrode in place due to the evaporation of water between adjacent threads. In other instances, the coupling is accidentally damaged or mechanically distorted.

Ideally, hoses should be capable of attachment and detachment with respect to a water supply tap through the use of ordinary finger pressure by individuals of ordinary or even limited physical capability. Because of the difficulties in effecting and maintaining finger-tightenable connections, however, the fixtures carried at the ends of typical water hoses are provided with knurled, ribbed or otherwise configured surfaces adapted for gripping by pliers, a wrench or other leverage device. Some hose couplings are provided with polygonal (typically hexagonal), wrench-receiving surfaces to accommodate a crescent wrench or similar adjustable leverage tool. The provision of such adaptations to hose coupling fixtures provides a means for effecting water-tight connections and disconnection but only if an appropriate tool is available. Without such tools, it is difficult for an ordinary person reliably to effect a connection or disconnection of conventional hose couplings. This difficulty is especially noticeable as individuals lose finger dexterity and strength due to advancing age or debilitating conditions such as arthritis.

U.S. Pat. No. 4,817,997 (Ingram) discloses a hose coupling with a metal sleeve cinched onto a hose near the male-threaded end of the coupling. By exerting torque on the metal sleeve, the male-threaded end is either connected to or disconnected from the coupling. The metal sleeve provides a hand hold to maintain the male-threaded end of a hose stationary while turning the female-threaded portion of the coupling onto the male-threaded portion. In practice however, torque and rotational movement are ordinarily applied to the female end of the hose coupling which is provided with a rotating connection to avoid twisting of the hose. A serious drawback of the Ingram device is that rotation of the metal sleeve of necessity effects a rotation of the entire hose to which it is crimped.

There remains a need for an improved system whereby the coupling and decoupling of hose connections can be effected by persons of ordinary capabilities, including those with limited finger dexterity, without the need for special wrenches or other auxiliary means.

SUMMARY OF THE INVENTION

The present invention provides a slidable, reinforcement sleeve which carries a wrench head at one end. The wrench head is adapted to register snugly with a properly-configured portion of a hose coupling. Although the invention will be described with principal reference to hose lengths having a female coupling at the supply end, a sleeve of this invention can be adapted to register with a properly-configured portion of a male coupling fixture as well. In most instances within contemplation however, kinking tends to occur in the proximity of the connection of a hose to an outdoor water tap, and it is the female member of a hose coupling which is conventionally attached to such a fixture.

With the wrench head portion of the reinforcement sleeve placed in registration with the hose coupling, the sleeve can be gripped by hand and turned selectively to tighten or loosen a coupling from the water tap or from a complementary coupling. The sleeve is otherwise positionable in conventional fashion to reinforce the hose at a kink-prone location.

The invention may be embodied as an assembly of one or more sleeves installed on a length of hose carrying suitable end couplings. In other instances, the invention may be embodied as a retrofit kit. A typical such kit might include a sleeve properly dimensioned to slide over an existing hose, usually over the male end, and at least one coupling adaptor for attachment to the existing female and/or male portions of the existing hose couplings. These adaptors provide exterior surfaces configured to register with the wrench end of a sleeve. In instances in which the inside diameter of the sleeve must be considerably enlarged to fit over the existing hose coupling, suitable spacers may be provided between the sleeve and the exterior wall of the hose to provide adequate support to assist in the antikinking function of the sleeve.

The sleeve may be provided with any convenient external surface configuration. A hollow cylinder with a polygonal cross section, the interior diameter of which slightly excedes the diameter of the hose, is presently preferred. The end portion of the sleeve interior registers with a corresponding polygonal wrench surface of a hose coupling member. Preferably, flat external surfaces of the coupling register with corresponding flat interior surfaces of the wrench end of the sleeve. According to other embodiments, the sleeve may be configured as a circular cylinder slightly larger than the exterior dimension of the hose. An enlarged polygonal wrench portion may be carried at one end. The wrench end is oriented towards the coupling with which it is adapted to register. The sleeve may further be configured at its exterior with ribs, flats or roughened configurated surfaces to provide improved gripping contact with the hand. Although not presently preferred, it is within contemplation that the wrench portion of the sliding sleeve of this invention be configured to adapt to the ridged or knurled outer surface of a conventional female hose coupling.

BRIEF DESCRIPTION OF THE DRAWINGS

In the drawings which illustrate that which is currently regarded as the best mode for carrying out the invention.

DESCRIPTION OF THE ILLUSTRATED EMBODIMENTS

Figure 1:
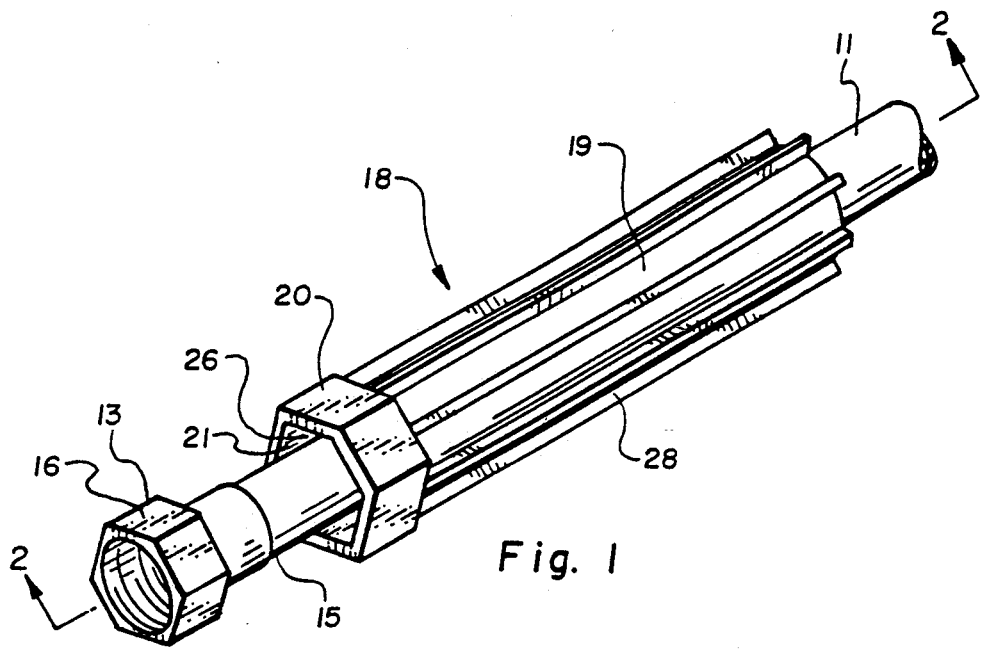
FIG. 1 is a pictorial illustration of a typical slidable, anti-kink sleeve of this invention mounted on a garden hose hear the end carrying the female portion of the hose coupling.
Figure 2:
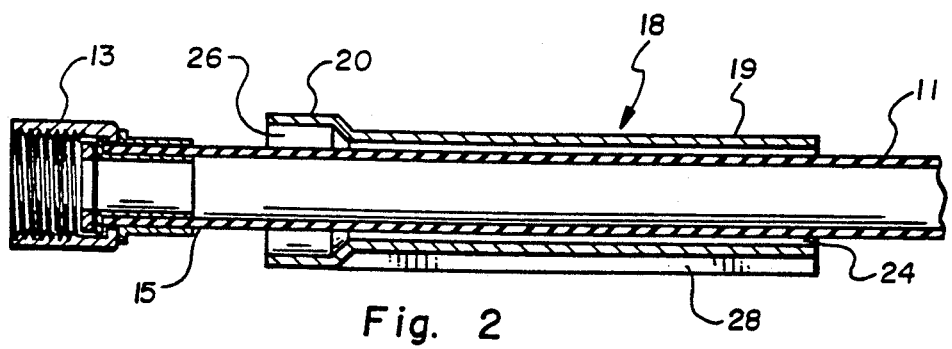
FIG. 2 is a view in cross section taken along the reference line 2—2 of FIG. 1.

The embodiment illustrated by FIGS. 1 and 2 comprises a water hose 11 carrying a female coupling 13 at its supply end 15. The external surface of the coupling 13 is configured as a hexagonal prism with wrench flats 16. A substantially rigid sleeve, designated generally 18, includes a main body portion 19 and an enlarged wrench end portion 20. The interior of the portion 20 is configured as a hexagonal cavity with flats 21 configured to register with flats 16. As illustrated, the interior 24 of body portion 19 is of smaller diameter than is the interior 26 of wrench end portion 20. This dimensional arrangement is sometimes preferred in instances in which the diameter of the hose 11 is significantly smaller than is the diameter of the coupling 13. Means, such as a plurality of longitudinally-extending external bosses 28 of the type shown, may be provided on the exterior surface of the sleeve 18 for reinforcement and to provide an improved gripping surface. The arrangement illustrated is conveniently provided in combination as original equipment.

Figure 3:
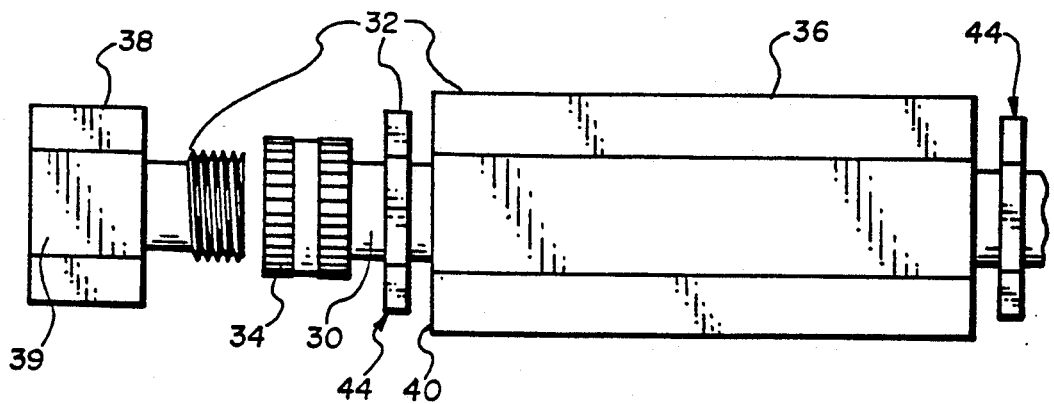
FIG. 3 is an exploded view of an alternative assembly of this invention.
Figure 4:
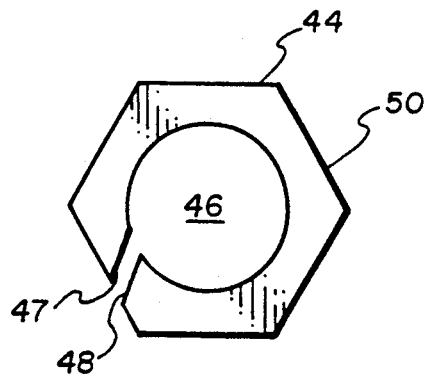
FIG. 4 is a view rotated 90° of one of the components illustrated by FIG. 3.
Figure 5:
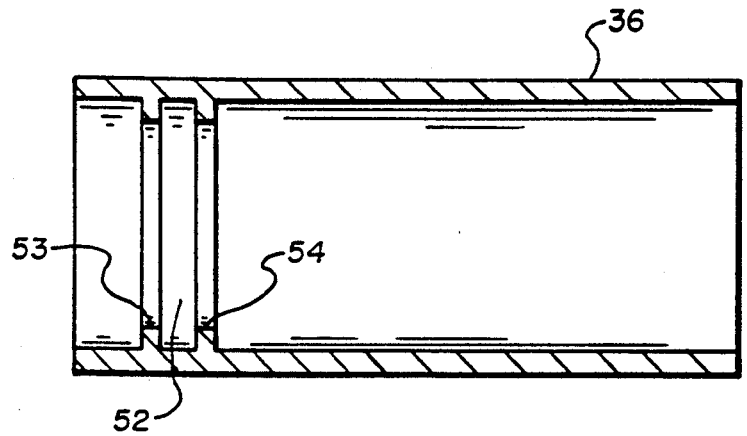
FIG. 5 is a fragmentary, cross-sectional view of another component of the assembly of FIG. 3.

An alternative embodiment, as illustrated by FIGS. 3 through 5, permits use of the invention with hose lengths 30 already available in the field. The various components of a conversion kit, designated generally 32, are sized and configured to accommodate a conventional hose coupling 34. A sleeve 36, illustrated as a hollow cylinder of polygonal cross section, has an insufficiently large interior cross section to slide over the female coupling 34. An adaptor 38 connects to the coupling 34 and includes exterior flat surfaces 39 adapted to register with the interior of the end 40 of the sleeve 36. Means, such as the spacer element 44, best illustrated by FIG. 4, may be provided to lend additional rigidity and support between the sleeve 36 and hose 30.

To install the components 32, the sleeve 36 is slipped over the male end (not shown) of the hose 30 so that the end 40 approaches the coupling 34. A spacer element 44 may precede the sleeve 36, and a second such element may follow the sleeve over the hose. The interior openings 46 of the elements 44, when the surfaces 47, 48 are in abutment, are sized to slide easily along the hose 30 in a longitudinal direction. The surfaces 47, 48 may be manipulated to pass the sidewall of the hose 30 between them into the interior opening 46. This opening will ordinarily not be sufficiently large to pass the coupling 34. The perimeters 50 of the elements 44 may be pressfit into channels 52 defined by interior structures 53, 54 of the sleeve 36. The adapter 38 may then be connected to the coupling 34.

Many other configurations and specific embodiments of the invention are within contemplation. Sleeves of various lengths and cross sections are useful as are wrench ends of various configurations. It is within contemplation for the sleeve to carry more elaborate fixtures than those illustrated to interact with specialized coupling fixtures.

Figure 6:
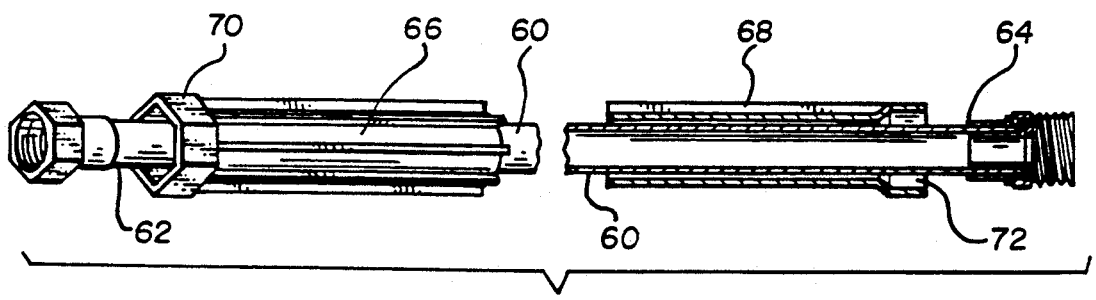
FIG. 6 is a pictorial view of an embodiment in which a hose with threaded fixtures at its opposite terminal ends carries reinforcing sleeves of this invention adapted to register with the respective fixtures.

Sleeves of the type disclosed may be carried at opposite ends of hose lengths to facilitate their interconnections. Thus, as shown by FIG. 6, a hose 60 with first 62 and second 64 threaded couplings may be provided in combination with first 66 and second 68 reinforcement sleeves each of which includes a wrench end 70, 72, respectively, oriented towards a respective coupling 62, 64 and adapted to register with a respective coupling. The sleeves then provides means for applying torque to the respective couplings through respective wrench ends.

Reference herein to details of the illustrated embodiments is not intended to restrict the scope of the appended claims which themselves recite those details regarded as important to the invention.

What is claimed is:

1. A device with a water hose which carries a threaded coupling at one end adapted to couple with corresponding threads carried by a water tap fixture, the exterior of said coupling being structured for engagement by a wrench, said device comprising:

a sleeve portion with a hollow interior configured to slidably pass said hose so that the sleeve can be selectively positioned exterior said hose in the vicinity of a kink-prone portion of said hose, thereby to prevent the development of a kink in said hose at said position; and a wrench end portion carried by said sleeve portion oriented and adapted to register with the exterior of said coupling, thereby providing means for applying torque by rotation of said sleeve to said coupling.

2. A device according to claim 1 wherein said sleeve portion is of sufficient length to maintain said hose in an unkinked condition.

3. A device according to claim 2 wherein the cross section of said sleeve is sized and configured to enable its ready movement along the longitudinal axis of said hose when said hose is in an approximately straightened condition.

4. A device according to claim 3 wherein the cross sectional configuration of said sleeve is non-circular.

5. In combination, a water hose with a female threaded coupling fixture at a terminal supply end, said fixture including an exterior surface structured for engagement by a wrench and an external reinforcing sleeve slidably carried by said hose so that it is movable along the length of said hose and including a wrench end adapted to register with said external surface of said fixture, said sleeve constituting means for applying torque to said fixture through said wrench end.

6. A combination according to claim 5 wherein said fixture includes external flat surfaces and said wrench end includes corresponding internal flat surfaces.

7. In combination, a water hose with first and second threaded fixtures at opposite terminal ends and first and second reinforcing sleeves slidably carried and selectively positionable along the length of said hose, each said sleeve including a wrench end adapted to register with respective said first and second fixtures, said sleeves constituting means for applying torque to the exterior of said fixtures through said wrench ends.

8. A reinforcement sleeve for a water hose including a body portion slidably mounted over the sidewall of a said hose so that it is movable and selectively positionable along the length of said hose, said body portion being integral with a wrench portion oriented towards a terminal end of said hose, said terminal end carrying a coupling fixture having an exterior configured for engagement by said wrench portion of said sleeve, whereby said sleeve may be turned to apply torque to the exterior of said coupling fixture.

9. A reinforcement sleeve according to claim 8 in combination with a hose carrying a female-threaded coupling fixture at a supply end, said wrench portion being adapted to register with said coupling.

10. A combination according to claim 9 wherein the cross-sectional configuration of the external surface of said sleeve is polygonal.

* * * * *